United States Patent
Lunadier et al.

(10) Patent No.: US 11,256,632 B2
(45) Date of Patent: *Feb. 22, 2022

(54) SYSTEM BUS TRANSACTION QUEUE REALLOCATION

(71) Applicant: Atmel Corporation, Chandler, AZ (US)

(72) Inventors: Franck Lunadier, Trets (FR); Vincent Debout, La Ciotat (FR)

(73) Assignee: Atmel Corporation, Chandler, AZ (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/265,057

(22) Filed: Sep. 14, 2016

(65) Prior Publication Data

US 2017/0004097 A1 Jan. 5, 2017

Related U.S. Application Data

(63) Continuation of application No. 14/100,225, filed on Dec. 9, 2013, now Pat. No. 9,471,524.

(51) Int. Cl.
*G06F 13/16* (2006.01)
*G06F 13/36* (2006.01)
*G06F 13/14* (2006.01)
*G06F 13/364* (2006.01)
*G06F 13/42* (2006.01)

(52) U.S. Cl.
CPC .......... *G06F 13/1642* (2013.01); *G06F 13/14* (2013.01); *G06F 13/36* (2013.01); *G06F 13/364* (2013.01); *G06F 13/4282* (2013.01)

(58) Field of Classification Search
CPC ...... G06F 13/1642; G06F 13/14; G06F 13/36; G06F 13/364; G06F 13/4282
See application file for complete search history.

(56) References Cited

U.S. PATENT DOCUMENTS

| | | | |
|---|---|---|---|
| 5,025,370 A | 6/1991 | Koegel | |
| 5,680,402 A | 10/1997 | Olnowich | |
| 5,854,906 A * | 12/1998 | Van Loo | ............. G06F 13/4022 710/110 |
| 6,170,032 B1 | 1/2001 | Izzard | |
| 7,023,840 B2 | 4/2006 | Golla et al. | |
| 7,062,582 B1 | 6/2006 | Chowdhuri | |
| 7,080,177 B2 | 7/2006 | Neuman | |
| 7,130,946 B2 | 10/2006 | Abhay et al. | |
| 7,302,686 B2 | 11/2007 | Togawa | |
| 7,549,004 B1 | 6/2009 | Sousa et al. | |

(Continued)

*Primary Examiner* — Henry Tsai
*Assistant Examiner* — Aurangzeb Hassan
(74) *Attorney, Agent, or Firm* — TraskBritt

(57) ABSTRACT

A bus architecture is disclosed that provides for transaction queue reallocation on the modules communicating using the bus. A module can implement a transaction request queue by virtue of digital electronic circuitry, e.g., hardware or software or a combination of both. Some bus clogging issues that affect conventional systems can be circumvented by combining an out of order system bus protocol that uses a transaction request replay mechanism. Modules can evict less urgent transactions from transaction request queues to make room to insert more urgent transactions. Master modules can dynamically update a quality of service (QoS) value for a transaction while the transaction is still pending.

21 Claims, 13 Drawing Sheets

(56) References Cited

U.S. PATENT DOCUMENTS

| | | |
|---|---|---|
| 7,710,989 B2 | 5/2010 | Chew |
| 7,774,356 B2 | 8/2010 | Cui |
| 7,925,805 B2 | 4/2011 | Shin et al. |
| 8,199,751 B2 | 6/2012 | Scandurra et al. |
| 8,566,612 B2 | 10/2013 | Davis et al. |
| 8,612,648 B1 * | 12/2013 | Murray ............... G06F 13/382 710/14 |
| 2002/0094847 A1 | 7/2002 | Han |
| 2002/0126541 A1 | 9/2002 | Spiegel et al. |
| 2002/0178232 A1 | 11/2002 | Ferguson |
| 2004/0236887 A1 | 11/2004 | Kim et al. |
| 2005/0060710 A1 | 3/2005 | Kush |
| 2006/0143396 A1 * | 6/2006 | Cabot ................... G06F 12/126 711/134 |
| 2006/0190649 A1 | 8/2006 | Ganasan |
| 2006/0271715 A1 | 11/2006 | Harris et al. |
| 2007/0130344 A1 | 6/2007 | Pepper |
| 2007/0204076 A1 | 8/2007 | Arulambalam et al. |
| 2008/0186862 A1 * | 8/2008 | Corbett ............. H04W 72/0486 370/237 |
| 2008/0244131 A1 | 10/2008 | Vergnes et al. |
| 2009/0287865 A1 | 11/2009 | Aidworth et al. |
| 2009/0323532 A1 | 12/2009 | Lai |
| 2011/0119413 A1 | 5/2011 | Gulati et al. |
| 2011/0302345 A1 | 12/2011 | Boucard et al. |
| 2011/0307895 A1 | 12/2011 | Liao |
| 2012/0110106 A1 | 5/2012 | De Lescure et al. |
| 2012/0110535 A1 | 5/2012 | Iwahashi et al. |
| 2012/0159088 A1 | 6/2012 | Balkan et al. |
| 2012/0198266 A1 | 8/2012 | Hofmann et al. |
| 2013/0042032 A1 | 2/2013 | Mannava et al. |
| 2013/0159458 A1 | 6/2013 | Yu |
| 2014/0136644 A1 | 5/2014 | Tuononen |
| 2014/0164659 A1 | 6/2014 | Quddus |
| 2014/0165216 A1 * | 6/2014 | Kwag ................... G06F 21/629 726/30 |
| 2015/0161065 A1 * | 6/2015 | Lunadier ............... G06F 13/364 710/110 |

* cited by examiner

SYSTEM BUS TRANSACTION QUEUE REALLOCATION

CLAIM OF PRIORITY

This application is a continuation and claims priority to U.S. patent application Ser. No. 14/100,225, filed on Dec. 9, 2013, now U.S. Pat. No. 9,471,524, issued Oct. 18, 2016, the entire contents of which are hereby incorporated by reference.

TECHNICAL FIELD

This disclosure relates generally to data communication bus architectures.

BACKGROUND

In some microcontrollers, bus masters are connected to bus slaves fully or partially through one or more bus matrix ports and switches. In these microcontrollers, data transfer requests from the masters to the slaves have to pass successively through several arbitration nodes. At any time, a given master may have several pending data transfer requests. Each of these transfer requests may have a dynamically changing urgency based on latency and/or bandwidth requirements.

Bus arbitration is used in these microcontrollers to meet each master's bandwidth and latency requirements and to maximize the overall available bandwidth of the system. In these microcontrollers, the arbitration nodes often arbitrate conflicts locally in the network space and only once at each arbitration node using a priority value that is statically associated with the data transfer request. Regardless of the priority of a data transfer request at any given arbitration node, the progress of the data transfer request to the target slave is dependent on the progress of the preceding transfer request at the next downstream arbitration node.

One solution to the congestion problem is to provide bus slaves with large queues that can store significant numbers of issued transfer requests. Storing the transfer requests frees up the network transfer request paths. If there is no congestion in the network transfer request path, data transfer requests can reach the arbitration end node in a short time so that high priority transfer requests are not ignored by the arbitration end node for a long time.

This queue solution has several drawbacks. Most slaves do not need large queues to arbitrate among waiting transfer requests to achieve optimization goals. For these slaves parking queues are a waste of area. For each slave, the queue should be large enough to store a number of transfer requests that is greater than or equal to the total number of transfer requests that may be issued collectively by all the masters connected to the slave. This is often not the case. If one of the slave parking queues fills up because it is not sized correctly, transactions may be backed up in the interconnect.

Due to ordering constraints on the bus or related deadlock problems, it may be impossible or complex to issue more than one transfer request at a time through a bus switch node when two or more destinations are implied. Some examples of ordering constraints are the situations observed at bus switch nodes for Advanced Microcontroller Bus Architecture (AMBA) Advanced eXtensible Interface (AXI) bus write transactions to two or more destinations and for AMBA AXI bus read transactions to two or more destinations with the same ID. A slave queue may be capable of storing more transaction requests but the network intrinsically can no longer issue more transaction requests. In these situations, an arbitration node can still block a high priority request upstream in the network transfer request path because locally at the arbitration node a slightly higher priority is given to another branch of the network, or because a fair use algorithm grants the ignored critical network branch later, or because by default a bandwidth optimization is running when no urgency is seen at the arbitration node. In these situations, the arbitration scheme is inconsistent throughout the overall bus network, resulting in stability and performance problems.

Other solutions have been proposed to circumvent some of the problems described above, including restraining the number of requests or the request rate at the masters to avoid network and slave queue congestion, local bandwidth reservation at the network nodes, longer slave queues with queue room reservation for some critical masters, enlarged or duplicated bus layers. These solutions, however, often require increased logic complexity or have over constraints that may prevent bandwidth optimization.

Bus protocols with no outstanding transactions support and strongly ordered bus protocols, such as AMBA High Speed Bus (AHB) protocol, are even more problematic because they do not provide native quality of service support. Busses that implement these protocols have the advantage of small area and latency, but they also have stability and performance issues that prevent these busses from having a consistent and efficient system wide arbitration scheme.

SUMMARY

A bus architecture is disclosed that provides for transaction queue reallocation on the modules communicating using the bus. A module can implement a transaction request queue by virtue of digital electronic circuitry, e.g., hardware or software or a combination of both. Some bus clogging issues that affect conventional systems can be circumvented by combining an out of order system bus protocol that uses a transaction request replay mechanism. Modules can evict less urgent transactions from transaction request queues to make room to insert more urgent transactions. Master modules can dynamically update a quality of service (QoS) value for a transaction while the transaction is still pending.

Particular implementations of the system bus transaction queue reallocation techniques can provide one or more of the following advantages: 1) transaction requests can be consistently promoted through bus nodes up to and including a target bus slave, in accordance with quality of service requirements for the transaction request, and even when the target bus slave or other bus slave has a full transaction request queue; 2) using a transaction request replay mechanism initiated by the master, a bus master can update dynamically the quality of service requirement specific to any of its transactions even after the transaction request had already reached the targeted bus slave; 3) using a transaction request eviction and transaction request replay mechanism initiated by the bus slave, a bus slave can update its already full outstanding transaction queue with the more critical or relevant transaction requests that satisfy the current master requirements; 4) a small number of additional signals and buffer resources can turn a low complexity, low area standard bus, into a bus providing lower access latency than high complexity and area busses; 5) the system bus architecture can meet the quality of service needs encountered with out of order multiple outstanding transaction capable busses and devices; and 6) the system bus architecture enables the out of order replayable outstanding transaction requests to coexist with the standard one shot strongly ordered classic transfers over the same bus layers without restrictions.

DETAILED DESCRIPTION

The disclosed implementations can be included in a system-on-a-chip (SOC) integrated circuit that includes a plurality of system bus masters, some or all of which may be coupled, through one or more master ports which in turn may be coupled through one or more system bus matrix switches to a plurality of system bus slaves, some of which may be multiport bus slaves or single port bus slaves.

Figure 1:
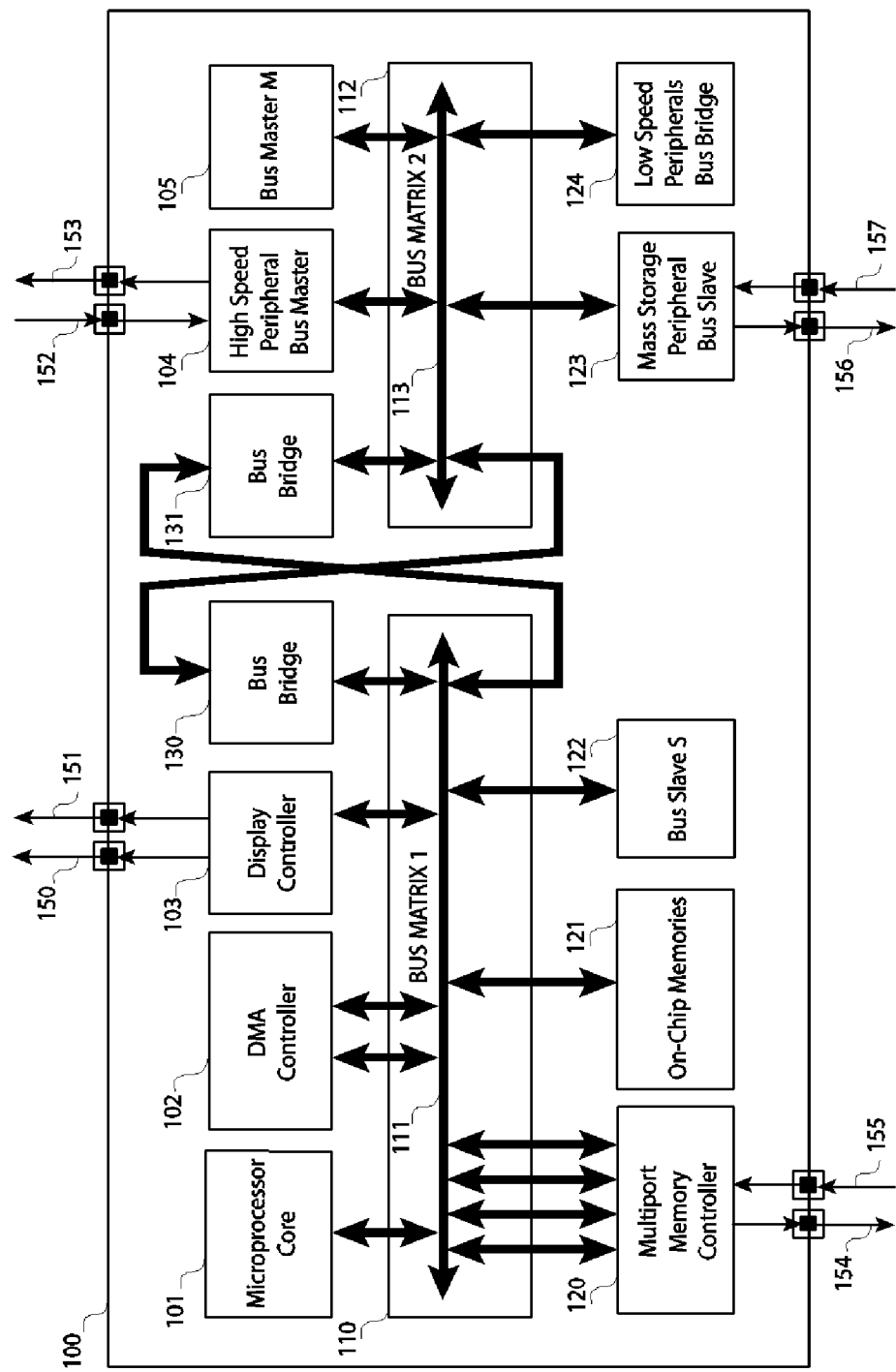
FIG. 1 is a block diagram an example microcontroller having at least one module configured to perform transaction queue reallocation.

FIG. 1 is a block diagram an example microcontroller 100 having at least one module configured to perform transaction queue reallocation. In some implementations, microcontroller 100 may include bus masters 101-105 and bus slaves 120-124. Other implementations may include more or fewer masters and slaves.

In the example shown, bus masters include microprocessor core 101, Direct Memory Access (DMA) controller 102, display controller 103, high-speed peripheral bus master 104 and bus master M 105. Bus slaves include multiport memory controller 120, on-chip memories 121, bus slaves 122, mass storage peripheral bus slave 123 and low-speed peripherals bus bridge 124. Bus slaves may be single port or multiport slaves having N slave ports that are individually connected to one of N or less slave ports of one or more system bus matrices. An example multiport slave is memory controller 120. Bus masters may be connected to one or more bus matrices, or directly to bus slaves using one or more master ports. Bus masters or bus slave peripherals may or may not be connected outside microcontroller 100 through dedicated pads 150-157.

Bus matrices 110, 112 may be used in the design of identical or distinct internal data bus widths, such as internal busses 111, 113, whether working or not at the same clock speed. Any matrix pair may provide interconnection through one or several master ports and one or several slave ports, such as matrix 110, which is shown coupled with only one of its slave ports to matrix 112 master port through bus bridge 131. Matrix 112 is shown coupled with only one of its slave ports to matrix 110 master port through bus bridge 130. Whether any given bus matrix slave can or cannot be accessed from a given master through a unique or through several paths is design dependent.

The modules can communicate on the bus using a non-blocking data bus protocol. With a non-blocking data bus protocol, slave modules do not stall the bus. Instead of stalling the bus, a slave module will release the bus layer at its ports after an amount of time, regardless of the internal state of the slave, The bus slaves may or may not be system bus endpoints. For example, bus slaves that are not system bus endpoints may act as a bus master on a further downward bus layer. Possible examples are the bus bridge 130 and 131. The bus bridge 131 can act as a bus slave of the bus matrix 110 and as a bus master of the bus matrix 112. To illustrate another example, bus slaves such as Slave 0 can serve not only as temporary storage for a downward bus, but also as a more complex final destination. An example of a more complex final destination is the Multiport Memory Controller 120.

In the example microcontroller, at least one master and at least one slave each implement a transaction request queue. A transaction request queue stores information about a number of requests that are in progress or are waiting to be processed. A module can implement a transaction request queue by virtue of digital electronic circuitry, e.g., hardware or software or a combination of both. In this example, some bus clogging issues that affect conventional systems can be circumvented by combining an out of order system bus protocol that uses a transaction request replay mechanism. Modules can evict less urgent transactions from transaction request queues to make room to insert more urgent transactions.

When a slave receives a new incoming transaction request but the transaction request queue at the bus is full, the slave can avoid stalling the bus by using transaction queue reallocation techniques. Each new transaction request can either be inserted into the slave transaction request queue or be temporarily postponed based on quality of service values for the incoming transaction requests and quality of service values for the transaction requests in the transaction request queue. The slave can process various requests, servicing, progress and completion of the transactions in any order suitable for improving or maximizing optimization goals within limits permitted by data consistency.

The slave can keep track of the postponed transaction requests, e.g., using a low overhead queue, e.g., one bit or more per transaction. When room becomes available in the slave transaction request queue, e.g., because the slave completes some of the transactions, then the slave can call back the postponed transaction requests. A postponed transaction request can be resumed from a data transfer beat where the transaction was left off until the transaction is fully completed. In some implementations, the slave calls back all of the postponed transaction requests and all of the called back transaction requests are reissued with transaction ordering constraints conserved. In some other implementations, the slave calls back certain subsets of the postponed transaction requests, e.g., until all of the postponed transaction requests are called back.

In some cases, a master determines that a transaction or a stream of transactions in its transaction request queue has changed priority. The master can update the quality of service value for the transaction or stream of transactions by reissuing the transaction requests with the transaction ordering constraints conserved. This is useful, for example, because more urgent transaction requests can get ahead of less urgent transaction requests along the path from the master to the slave. A master, having initiated a transaction request that is partially complete, can later initiate one or more subsequent replays of the transaction request from a data transfer beat where the transaction was left off, until the transaction is fully completed. The master can update the transaction quality of service value for the transaction data that is still to be transferred for that particular transaction.

Figure 2:
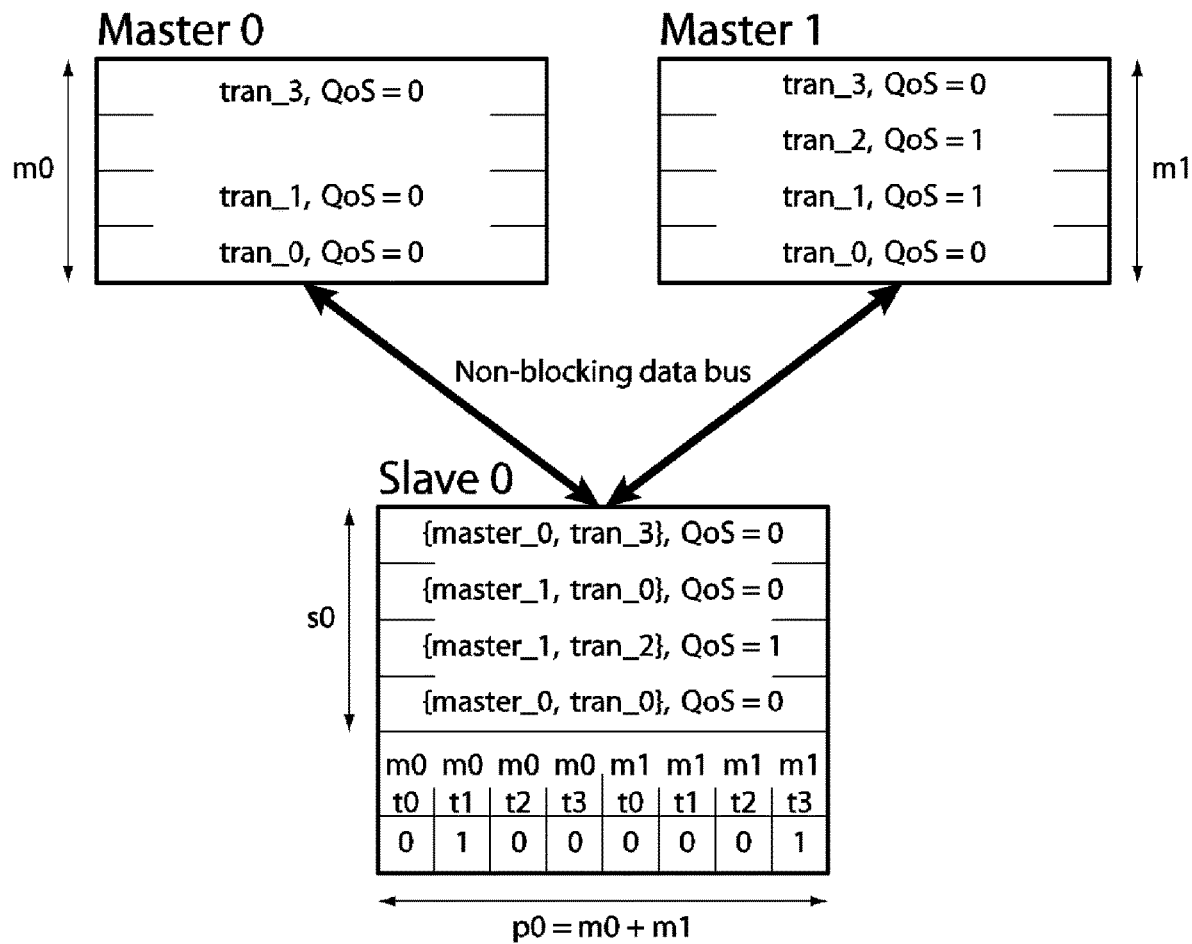
FIG. 2 is a schematic diagram illustrating two example master transaction request queues, for master modules Master 0 and Master 1, and one example slave transaction request queue, for slave module Slave 0.

FIG. 2 is a schematic diagram illustrating two example master transaction request queues, for master modules Master 0 and Master 1, and one example slave transaction request queue, for slave module Slave 0. The transaction request queues store transaction requests by storing characteristics of transactions, e.g., address data and size data.

The transaction request queue for Master 0 is configured to store up to m0 transactions. The transaction request queue for Master 1 is configured to store up to m1 transactions. The transaction request queue for Slave 0 is configured to store up to s0 transactions. The total number of transaction requests that can be pending at Slave 0 is p0. In the example where Master 0 and Master 1 are the only modules in a master/slave relationship with Slave 0, then p0=m0+m1. Depending on the individual designs of the slave and master modules and the connectivity between masters and slaves, s0 may be less than or equal to p0.

The slave is configured to flag pending transactions that are not stored in the transaction request queue. The number of pending transactions that can be flagged at the slave without being stored in the transaction request queue for the slave is r0. In some implementations, p0=s0+r0.

For example, slave 0 can include a low overhead buffer that stores pending transaction requests so that the characteristics of the transaction requests are not stored in the transaction request queue of the slave and instead are stored remotely at the master waiting to be replayed later. As shown in FIG. 2, one bit per each of the p0 transactions can be used for the p0 flags, m0t0 to m1t3. Each flag corresponds to a possible pending transaction request from one of the master modules. The slave can flag up to r0 remotely stored transaction requests as pending transactions to be replayed later at one of the slave ports.

In some implementations, a transaction request comprises address and control signals that are appropriately decoded, routed and arbitrated by the bus matrix switches for the transaction request to reach the slave targeted by the master initiating the transaction request. A transaction tag can uniquely identify each transaction on the system bus. The transaction tag can be, e.g., a pair comprised of the originating master identification tag or master number master_nb, together with a transaction number tran_nb unique for that particular master. The transaction tag can be written as follows: {master_nb, tran_nb}. The transaction tag can be timed as the other address and control signals of any transaction request.

For each of the transaction requests on the system bus, the data transfer progress count can be separately performed at both the master and the slave, or an explicit remaining data transfer length may be added to the bus control signals driven by the master. Although the explicit remaining data transfer length is not required, it is used in the examples of this application for purposes of illustration.

A priority or quality of service (QoS) value can be associated with each transaction request. In some implementations, the QoS value for a transaction request can vary over the lifetime of the transaction request, which is described further below. Depending on the implementation, the QoS value may or may not have a similar timing as the address and control signals. In the examples of this application, the QoS value is significant to the slave during some well-defined parts of the data phase.

The master can be configured to initiate or reissue the transaction requests at any stage of the transaction progress. The master can use the order implied by the slave transaction call-backs or the order inferred at the master from new QoS requirements of transactions, within the limits permitted by data consistency, e.g., conventional limits permitted by data consistency. For example, some slaves, e.g., bus peripherals, may require being addressed in a strongly ordered manner, whereas some memory device accesses may only need to be ordered in case there is an address space collision between two transactions. Further signaling on the bus may also relax the ordering constraints, e.g., using a transaction stream identifier.

The example scenario illustrated in FIG. 2 shows a more complex case where the masters and slaves can process transactions out of order, giving some minimum elements for in order transaction presentation requirements. For example, the multiport memory controller 120 of FIG. 1 may be likely to perform a lot of out of order transaction processing. As another example, some masters may have low average access latency, e.g., the microprocessor core 101 of FIG. 1. For those masters, the transactions progress may be illustrated to show the requests and/or data transfer units of two or more transactions interleaved on the bus.

For purposes of illustration, the Advanced Microcontroller Bus Architecture (AMBA) Advanced High-performance Bus (AHB) protocol will be used in the following illustrations. Any other appropriate protocol can be used. The system can be configured to append the following signals to the AMBA AHB protocol:

A transaction number tran_nb signal valid during the address phase of any AHB burst or single access.

A remaining length tran_rlen signal indicating, during each AMBA AHB address phase, the subsequent number of transaction address phases still to be completed by a data transfer for the current transaction {hmaster, tran_nb} in its address phase. This tran_rlen signal is optional but provided for purposes of illustration.

A quality of service signal QoS, valid at least during the second cycle of the bus slave SPLIT response to the transaction request previously in address phase and indicating the priority of this transaction. In some implementations, the higher the value on this signal, the higher the priority of the transaction.

For purposes of illustration, the AMBA AHB hburst signal indicating the burst type will be considered to be set in these examples to undefined incremental burst INCR. For each of the p possible {hmaster, tran_nb} pending transactions at a bus slave, an AMBA AHB corresponding HSPLIT bit signal is provided for the purposes of a transaction call-back by a bus slave.

A transaction can be essentially in one of two states at the master:
1) not launched yet, e.g., the {master_1, tran_1} transaction of FIG. 2; or
2) SPLIT-ed by the slave, e.g., the {master_0, tran_0} or {master_0, tran_1} transactions of FIG. 2.

A transaction can be essentially in one of two states at the slave:
1) remotely pending at the master; or
2) stored inside the slave transaction request queue.

The master does not need to know if the characteristics of the transaction have been stored at the slave or not. The slave is allowed to respond by a SPLIT at any of the transaction address beats. The master usually waits for the slave to call back a SPLIT-ed transaction through its dedicated HSPLIT bit before reissuing this transaction request on the bus from the address beat that the slave had SPLIT-ed previously, unless the master has some internal reason to initiate this reissuing, like a change in the transaction QoS requirements which needs to be updated at the slave.

Each time the slave provides an OKAY response for a transaction address beat, the corresponding data are transferred and the address for that transaction and its data beats are complete. Although not mandatory, the progress of the transaction can be determined using the tran_rlen value during each address beat. Address beats responded with a SPLIT will be later reissued with the same tran_rlen value, since no progress has been done for the transaction data transfers.

When the last address beat of a transaction is responded with OKAY, thus acknowledging the last data transfer, the transaction itself is complete at both the master and the slave. The transaction is then removed from both the master and the slave transaction queues. The master can immediately reuse the same transaction number for a new transaction to be launched for the first time.

As long as a transaction is not complete, both the master and the slave can initiate the restart of the transaction from the address beat where it was left off. This can be done as many times as required for all of the transaction address beats until the transaction finally successfully completes.

In some cases, the slave will only respond with a SPLIT to one or two of the transaction address beats, e.g., to the first address beat for read transactions and to the first and/or to the last address beat for a write transaction depending whether it can immediately accept the write data or not. In case all of the data can immediately be transferred, e.g., for buffered read data or buffered write data, all the transaction address beats can be responded with OKAY and the transaction will not be SPLIT-ed and not be in an outstanding state.

Figure 3:
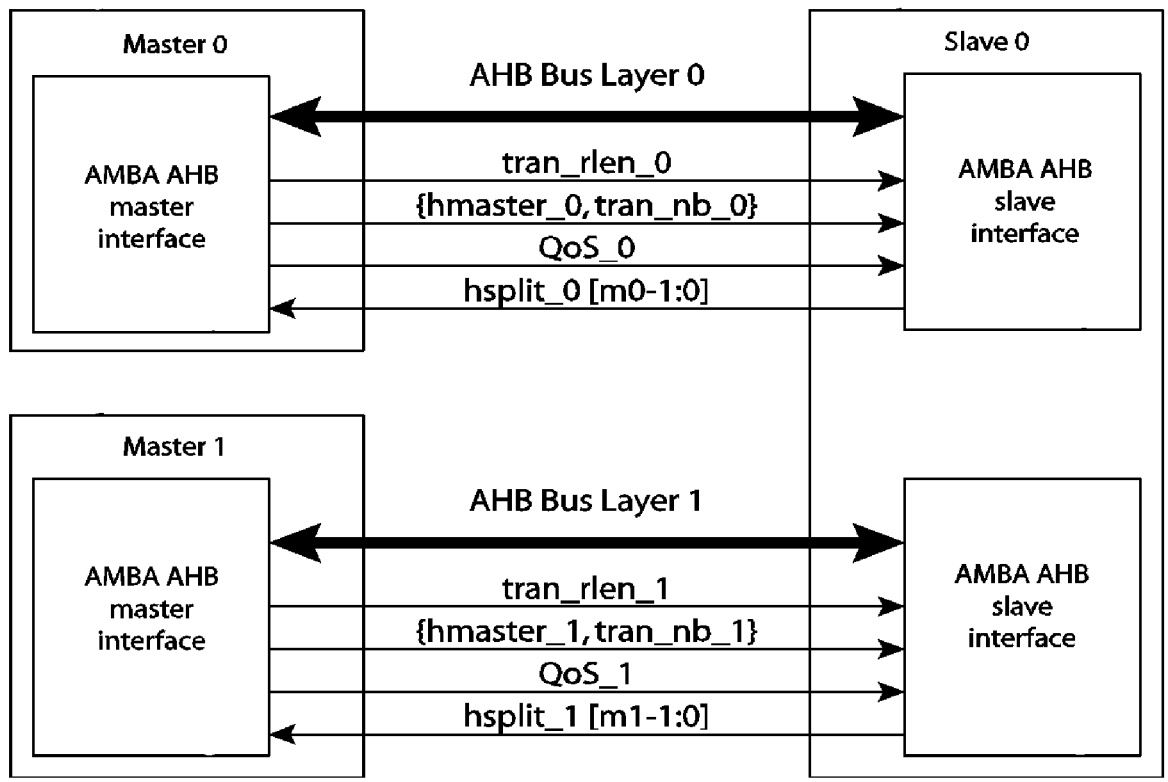
FIG. 3 is a block diagram illustrating an arrangement of modules corresponding to the scenario illustrated in FIG. 2.

FIG. 3 is a block diagram illustrating an arrangement of modules corresponding to the scenario illustrated in FIG. 2. FIG. 3 illustrates the AMBA AHB signals and the additional signals appended for transaction queue reallocation techniques.

Slave 0 is shown as an AHB multiport slave with one AHB bus master connected on each of its slave port. Note that the AMBA AHB bus permits other various implementations involving several slaves or slave ports connected to one AHB master and/or one slave port connected to several AHB masters.

The {hmaster_0, tran_nb_0} signals encode the current transaction requests from Master 0 during valid AHB address phase. The {hmaster_1, tran_nb_1} signals encode the current transaction requests from Master 1 during valid AHB address phase. The tran_rlen_0 signal encodes the subsequent number of transaction address phases still to be completed at Master 0. The tran_rlen_1 signal encodes the subsequent number of transaction address phases still to be completed at Master 1.

The QoS_0 signal encodes some quality of service requirements at Master 0. The QoS_1 signal encodes some quality of service requirements at Master 1. The hsplit_0 signal indicates at each system bus clock cycle the Master 0 called back transactions. This signal is made of one bit per Master 0 possible outstanding transaction number. The hsplit_1 signal indicates at each system bus clock cycle the Master 1 called back transactions. This signal is made of one bit per Master 1 possible outstanding transaction number.

Figure 4:
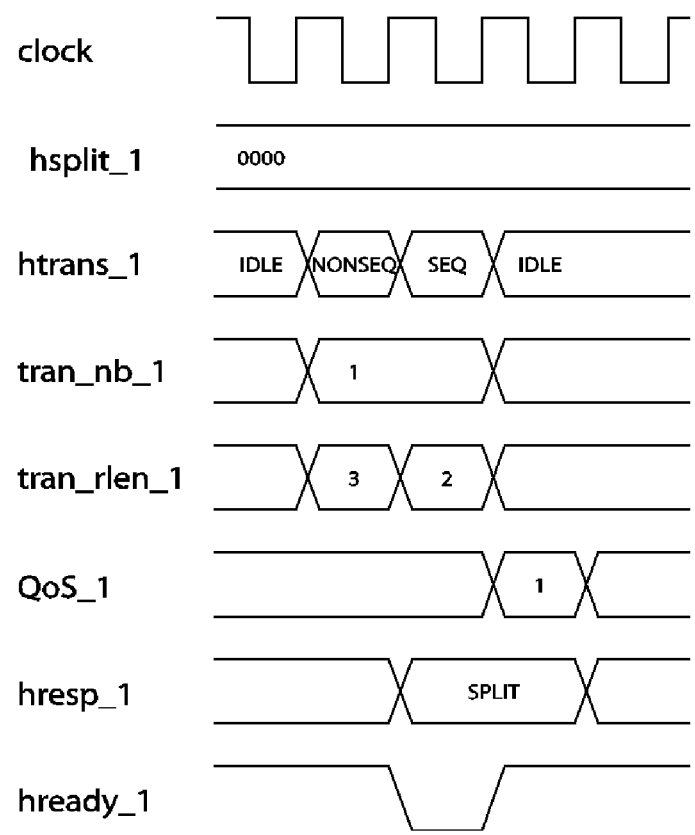
FIG. 4 is a timing diagram illustrating a number of bus signals over an example transaction sequence over the AHB bus layer 1.

FIG. 4 is a timing diagram illustrating a number of bus signals over an example transaction sequence over the AHB bus layer 1. The bus signals include the AHB bus signals and the additional signals.

The example transaction sequence shows an incoming transaction request, {master_1, tran_1}, for the slave from the Master 1 module. The incoming transaction request has a QoS value of one. On receiving this incoming transaction request, the slave can perform transaction request queue reallocation.

Figure 5:
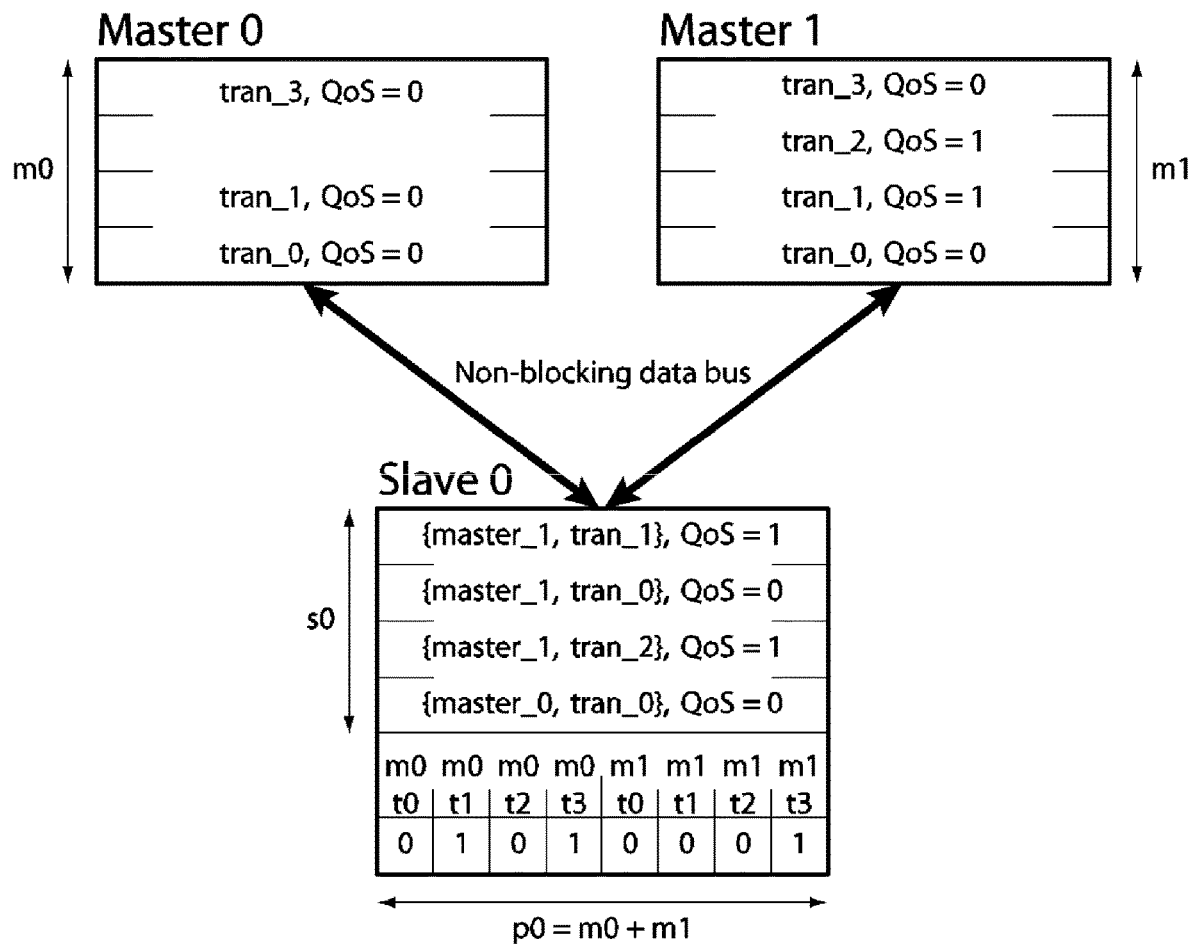
FIG. 5 is a schematic diagram illustrating the example master transaction request queues and slave transaction request queue of FIG. 2 after the example transaction sequence of FIG. 4.

FIG. 5 is a schematic diagram illustrating the example master transaction request queues and slave transaction request queue of FIG. 2 after the example transaction sequence of FIG. 4.

The Slave 0 transaction {master_0, tran_3} has been evicted from the slave transaction request queue because the queue was full and because the incoming transaction {master_1, tran_1} on the bus has a QoS value 1 greater than some of the Slave 0 s0 outstanding queue entries, e.g., the QoS value 0 of transaction {master_0, tran_3}. The m0t3 remotely remaining pending transaction request flag has been set. The {master_1, tran_1} transaction request has entered the Slave 0 s0 transaction queue buffer.

The slave can be configured to use any appropriate reallocation algorithm inside the slave transaction request queue. In some implementations, the evicted transaction will have a lower QoS value than the incoming transaction request and the lowest QoS value of all entries in the transaction request queue.

If there are several candidate outstanding transactions requests to be evicted, the evicted entry can be based on any appropriate algorithm, for example based on aging, thus evicting the newest of the candidates, or based on more complex optimization goals at the slave, e.g., for a dynamic memory controller, evicting an entry which address does not belong to an open memory bank or to the current memory raw rather than one that does. Depending on this reallocation algorithm and on the context, the evicted transaction request may or may not belong to the same master as the transaction replacing the evicted transaction.

Figure 6:
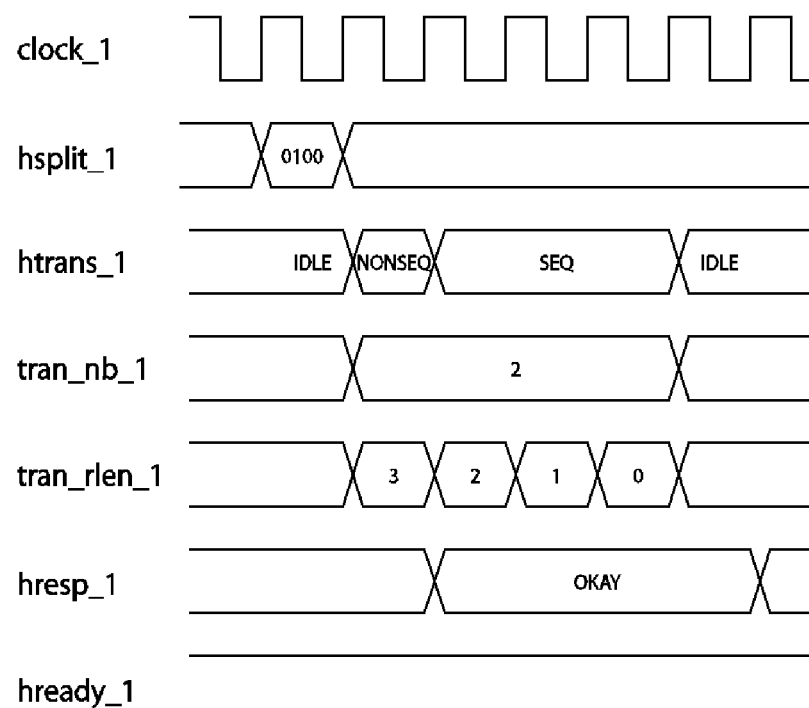
FIG. 6 is a timing diagram illustrating a number of bus signals over an example transaction sequence.

FIG. 6 is a timing diagram illustrating a number of bus signals over an example transaction sequence. The transaction sequence includes a call-back and completion of the {master_1, tran_2} transaction through hsplit_1[2] pulsing for one clock cycle.

Figure 7:
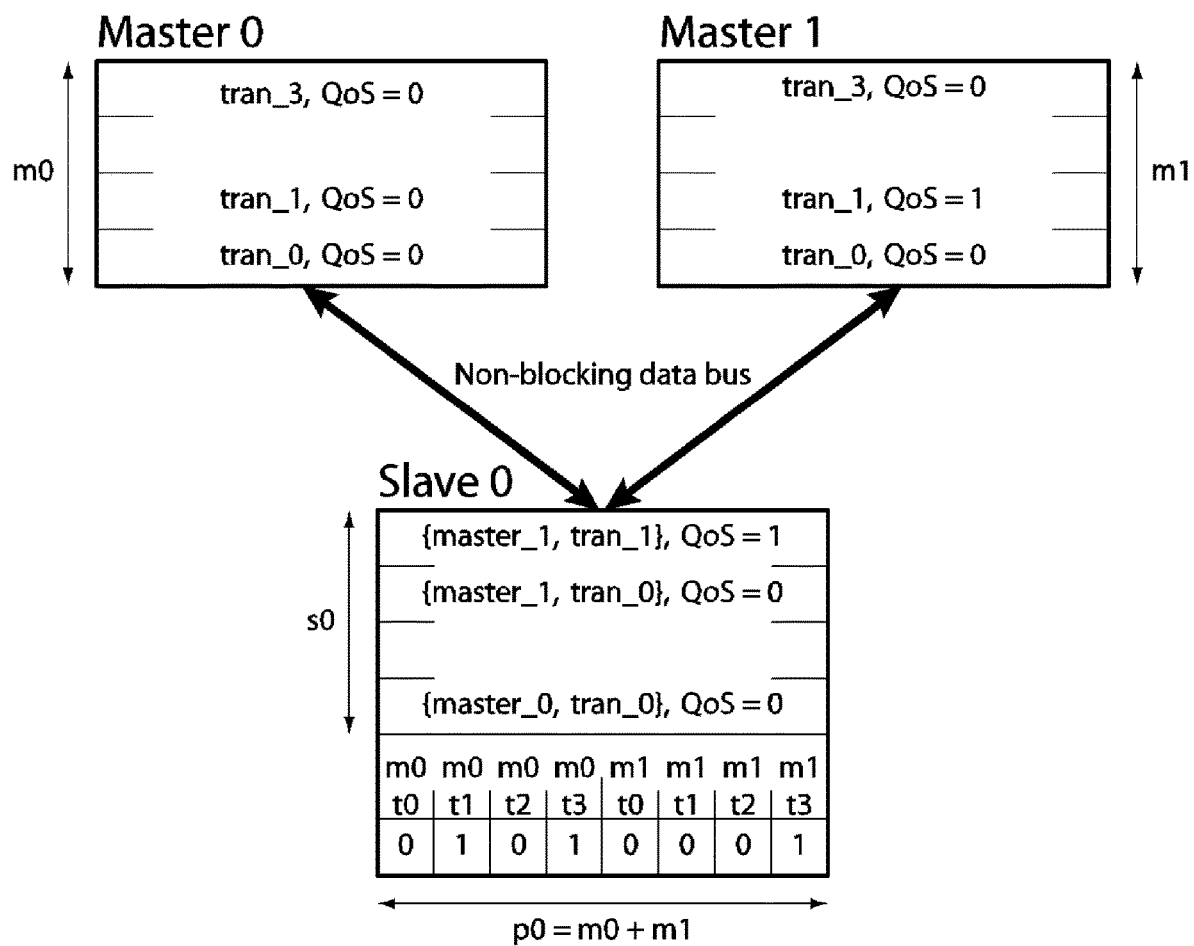
FIG. 7 is a schematic diagram illustrating the example master transaction request queues and slave transaction request queue of FIG. 5 after the example transaction sequence of FIG. 6.

FIG. 7 is a schematic diagram illustrating the example master transaction request queues and slave transaction request queue of FIG. 5 after the example transaction sequence of FIG. 6. The {master_1, tran_2} transaction has completed. As a result, there is some room available in the Slave 0 transaction request queue. The Slave 0 module can call back one or more, or all, of the remote pending transaction requests. As shown in FIG. 7, the flags are set for remote pending transaction requests for the m0t1, m0t3 and m1t3 transactions. The slave calls back these transactions requests by pulsing the corresponding hsplit bits hsplit_0[1], hsplit_0[3] and hsplit_1[3] during a clock cycle.

Figure 8:
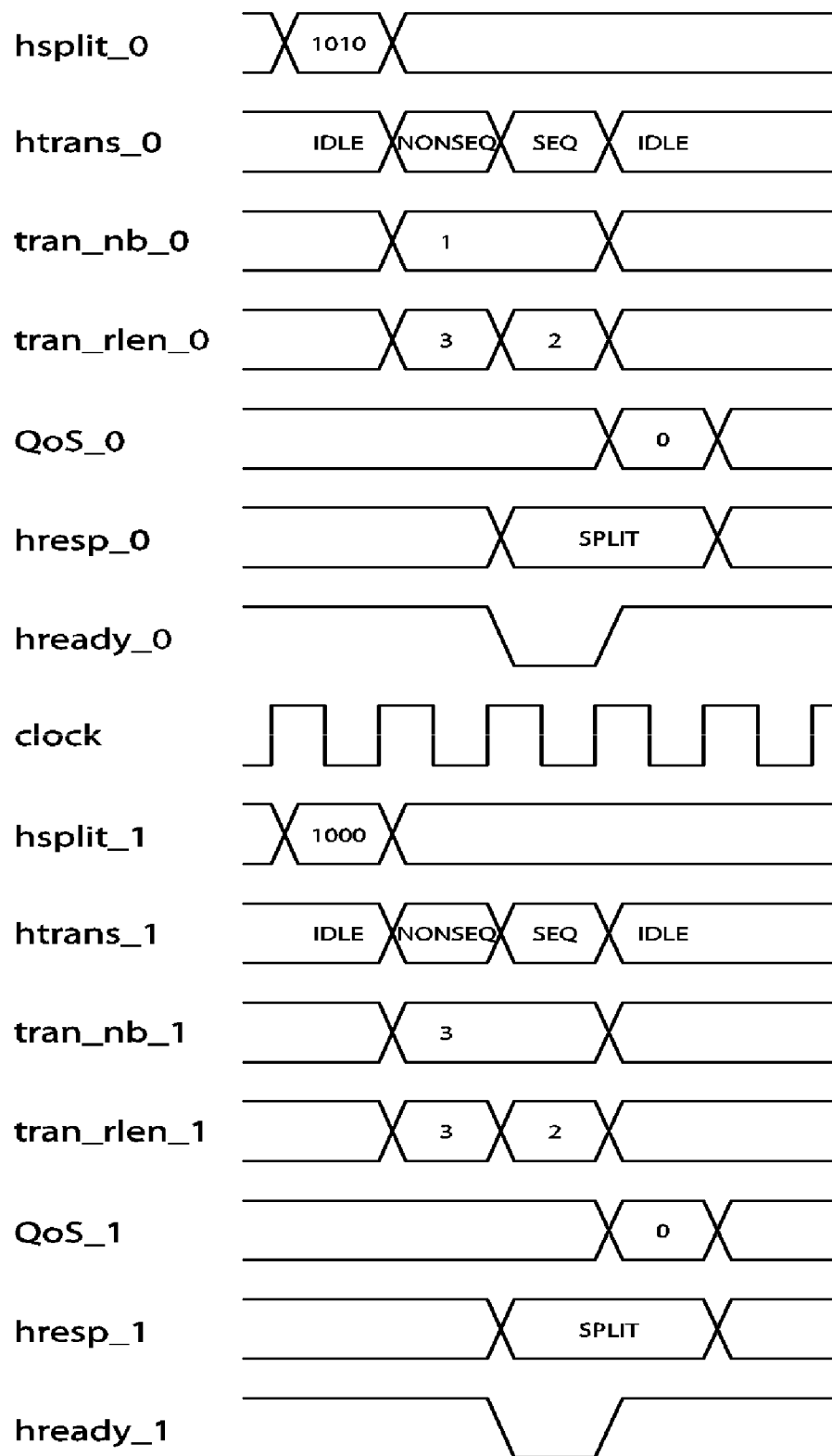
FIG. 8 is a timing diagram illustrating a number of bus signals over an example transaction sequence.

FIG. 8 is a timing diagram illustrating a number of bus signals over an example transaction sequence. The timing diagram shows the slave calling back the remote pending transaction requests illustrated in FIG. 7. The two masters, Master 0 and Master 1, reissue each of the called back transactions in their original issuing order, or any order if ordering is not required. The Slave 0 responds by a SPLIT on both AHB bus layers.

Figure 9:
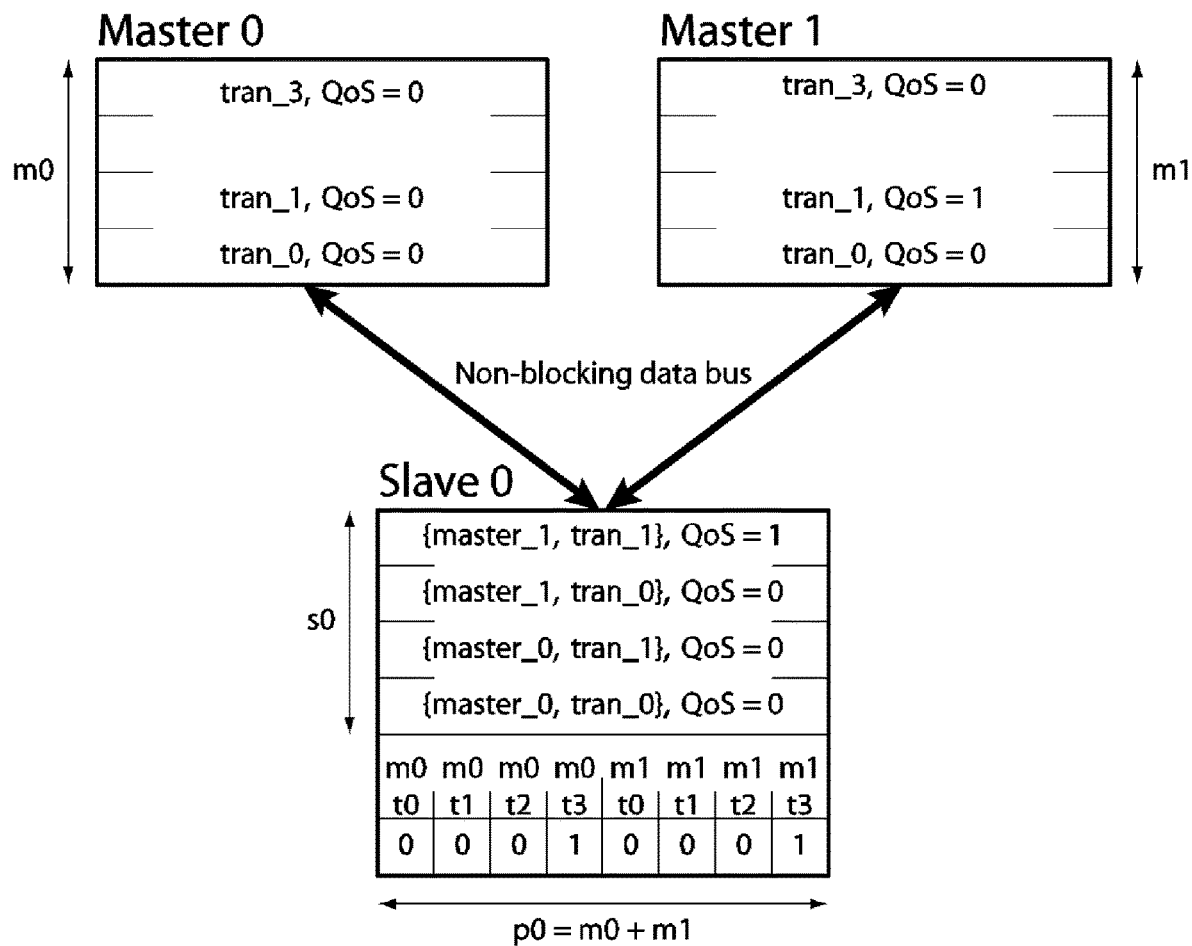
FIG. 9 is a schematic diagram illustrating the example master transaction request queues and slave transaction request queue of FIG. 7 after the example transaction sequence of FIG. 8.

FIG. 9 is a schematic diagram illustrating the example master transaction request queues and slave transaction request queue of FIG. 7 after the example transaction sequence of FIG. 8.

The {master_0, tran_1} transaction request has entered the Slave 0 transaction request queue. Consequently, the remote pending transaction flag m0t1 has been cleared. The slave can use any appropriate arbitration algorithm between several incoming requests qualified with the same QoS value at the slave ports if the slave is a multiport slave or inside a bus-switching matrix or otherwise. One example of an arbitration algorithm is a round-robin algorithm that enables each master in turn to be granted an available entry in the outstanding queue buffer, arbitrating among the simultaneous competing masters transactions qualified with a highest equal QoS.

Figure 10:
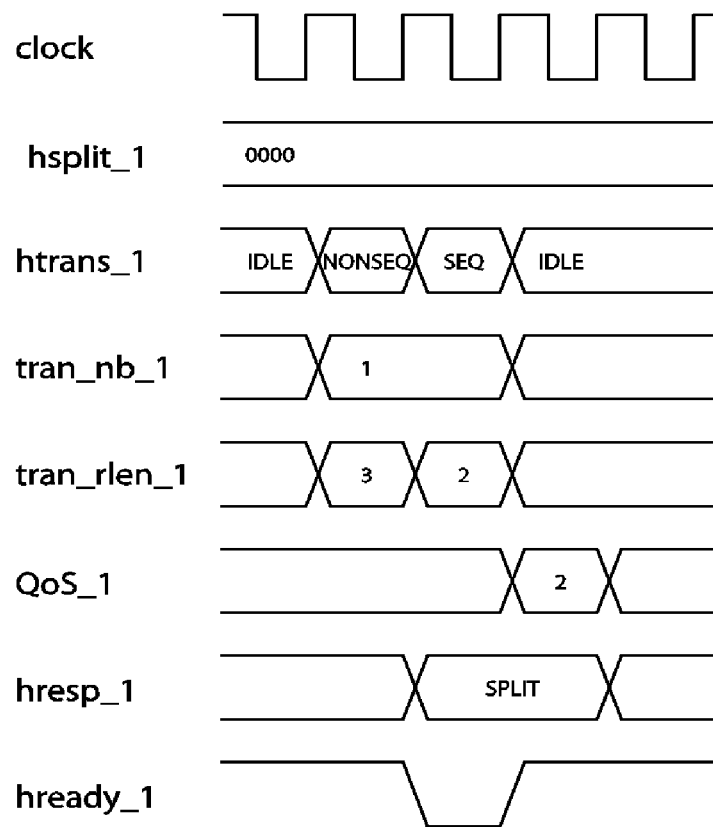
FIG. 10 is a timing diagram illustrating a number of bus signals over an example transaction sequence.

FIG. 10 is a timing diagram illustrating a number of bus signals over an example transaction sequence. The Master 1 transaction {master_1, tran_1} urgency has increased at the master from QoS=1 to QoS=2. The Master 1 then reissues the {master_1, tran_1} transaction request from the address beat where it was previously SPLIT-ed, with the increased QoS value 2.

If the transaction request was not already part of the Slave 0 transaction request queue, and instead was a flagged remote pending transaction, the eviction of a transaction request of lower QoS and its room reallocation process to the {master_1, tran_1} transaction request would have occurred. Instead, because the {master_1, tran_1} transaction request is already stored in the transaction request queue, the QoS value for that transaction request is updated within the transaction request queue.

Figure 11:
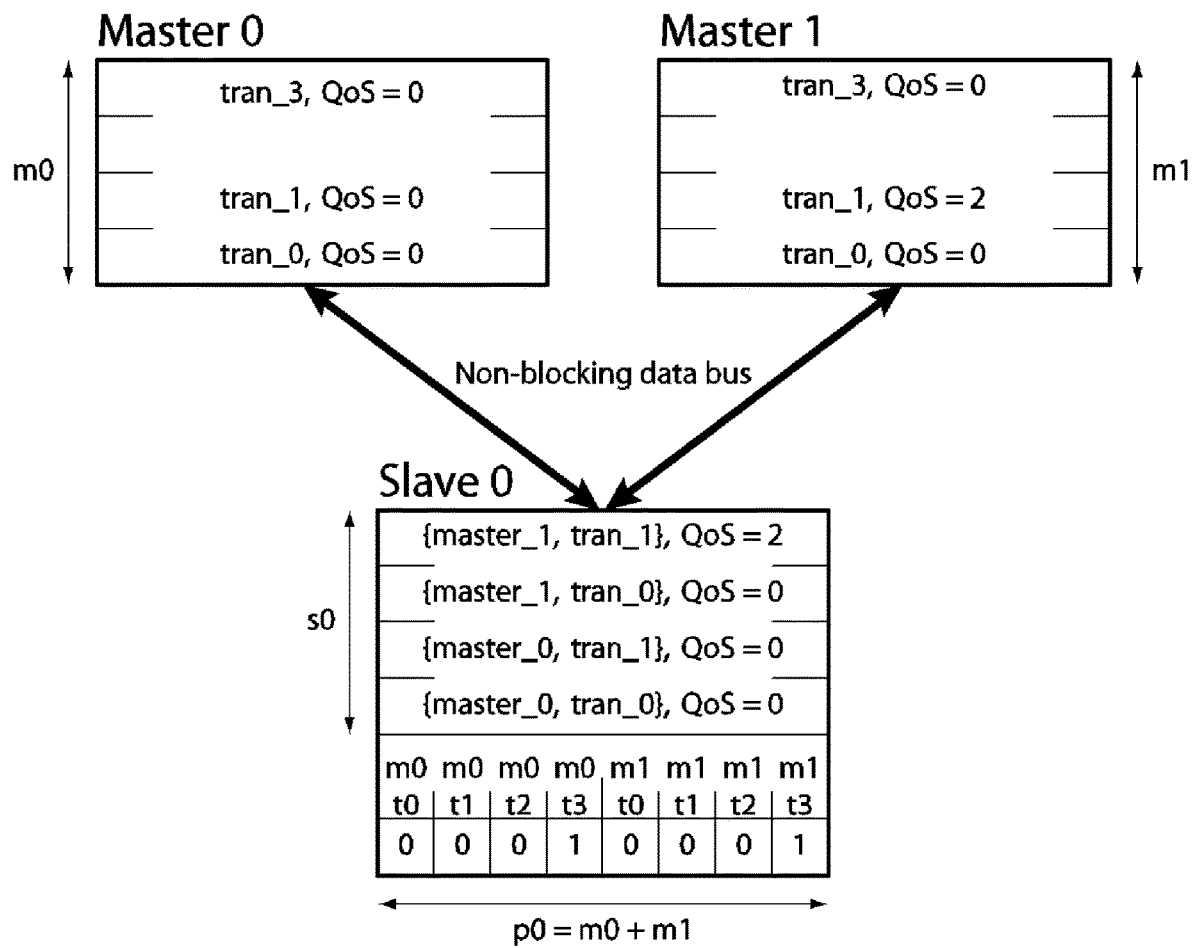
FIG. 11 is a schematic diagram illustrating the example master transaction request queues and slave transaction request queue of FIG. 9 after the example transaction sequence of FIG. 10.

FIG. 11 is a schematic diagram illustrating the example master transaction request queues and slave transaction request queue of FIG. 9 after the example transaction sequence of FIG. 10. The {master_1, tran_1} transaction request now has a QoS value of 2, and hence the master was able to update the QoS of that transaction while it was still pending at the slave.

Figure 12:
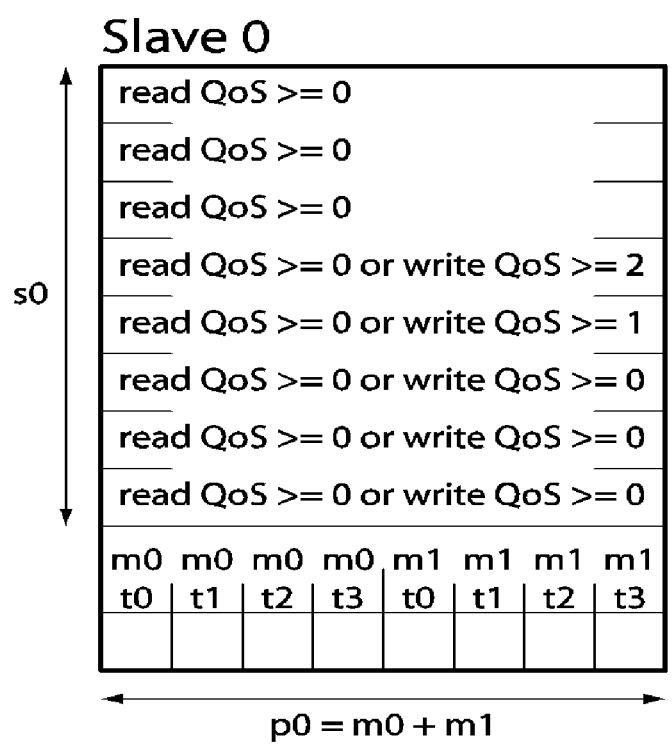
FIG. 12 is a schematic diagram illustrating an example partitioned slave transaction request queue.

FIG. 12 is a schematic diagram illustrating an example partitioned slave transaction request queue. The transaction request queue is partitioned into space that can be used only by read transactions and space that can be used by both read and write transactions.

Write transactions can pose certain challenges that read transactions do not. In some cases, the write transaction requests might not have their data processed just in time at the slave. For example, a dynamic memory controller might only be able to treat writes efficiently if it knows for sure that the data will be available on time to be written at its external interface. This may require the local buffering of the transaction data together with the other useful characteristics of the transaction like the address and size.

However, because a number of transactions might need several data transfers over the bus prior being fully buffered at the slave, it may not be practical to evict an already partly or fully buffered write transaction. This could require restarting the write transaction from an earlier point than the one it was left off at, which might add some complexity to the bus protocol. This is not supported, for example, by the AMBA AHB protocol. Furthermore, this could be time and power consuming.

The example slave, Slave 0, is configured to perform transaction queue reallocation for write transactions by enabling a limited number of read transactions to be evicted for that purpose. FIG. 12 shows a partitioning of the transaction requests queue at the Slave 0 in an example scenario where the possible QoS values on the bus are in the range from 0 to 2. Any read transaction request can be allocated to any of the already available room in the transaction queue buffer. This is possible because, e.g., a read transaction request can always be later evicted if needed.

A write transaction request can be allocated into some limited number of available slots inside the transaction request queue. This is to avoid the situation where the transaction request queue is already filled with write transactions while there is an incoming read transaction of higher QoS requirement that is then unable to enter the transaction request queue because the write transactions requests cannot be evicted.

This limited number of slots accessible for the write transactions is further restricted by QoS values. This is to guarantee that an incoming write transaction of higher QoS requirement than the transaction requests already stored at the transaction request queue can always enter the transaction queue buffer without requiring the eviction of a queue entry.

For the write transactions, FIG. 12 shows only one of the transaction request queue slots requiring at least a QoS value greater than or equal to 1 and only another one for QoS value greater than or equal to 2. Other implementations might have several possible entries associated to each of these minimum accepted QoS value for the incoming write transactions, e.g., one at least per master.

Figure 13:
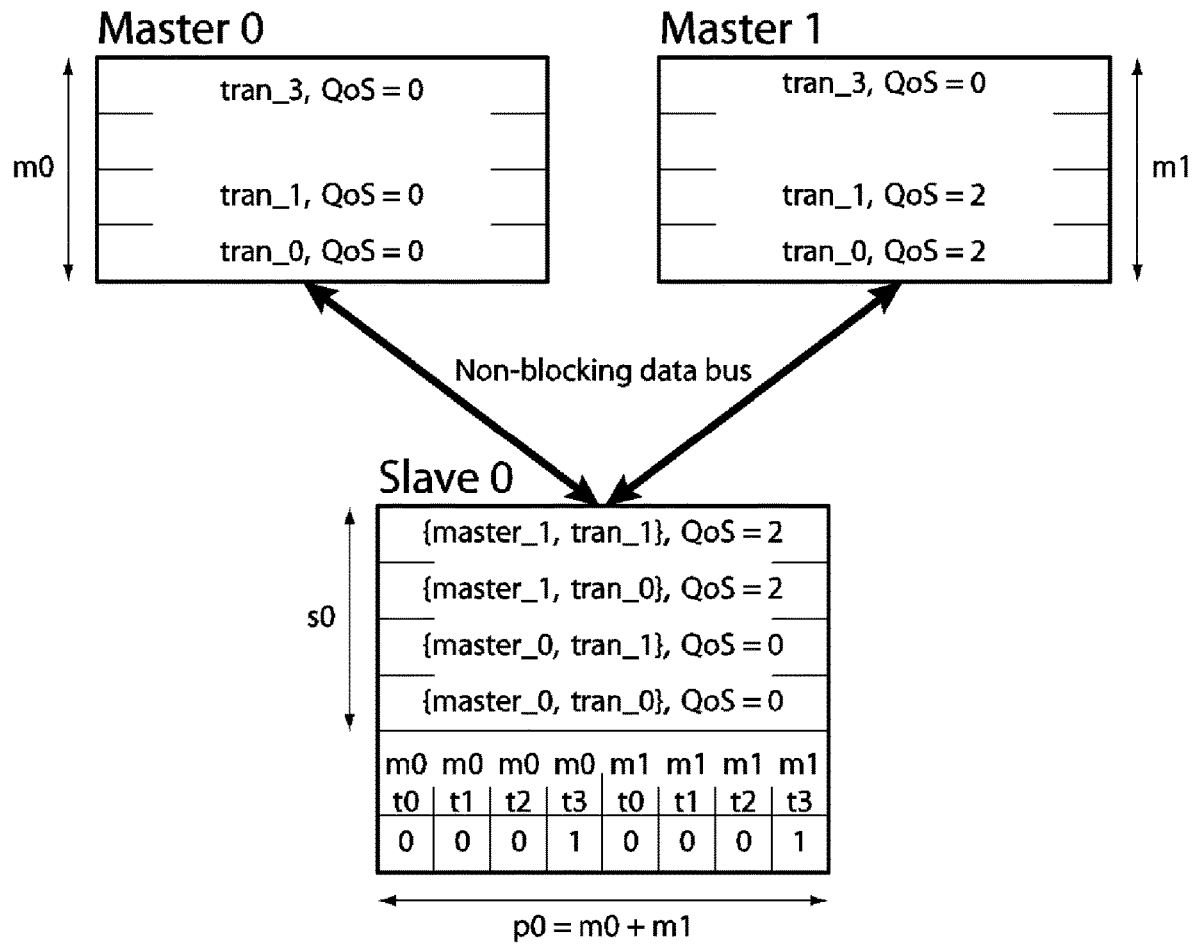
FIG. 13 is a schematic diagram illustrating example transaction request queues in an example where transactions issued by a master are known by the slave to be ordered.

FIG. 13 is a schematic diagram illustrating example transaction request queues in an example where transactions issued by a master are known by the slave to be ordered.

For example, suppose that the transactions issued by the master are known to be ordered, either implicitly or only when they share a same transaction stream identifier, and that the slave keeps track of this order or is able to retrieve this order by calling back the remotely pending transactions requests. Then, within the slave transaction request queue, an incoming transaction QoS update can automatically be inherited by the antecedent outstanding transactions from this master. For example in FIG. 13, the resulting states at the slave after the QoS update performed in FIG. 10 then shows the additional QoS update of {master_1, tran_0} if the slave determines that this transaction was initially issued at the Master 1 before {master_1, tran_1} and if the transaction order is relevant at both the Master 1 and Slave 0.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A system comprising:
a slave module implementing a slave transaction request queue and operable to:
receive a transaction request;
determine that the slave transaction request queue is full;
determine that a quality of service value for the transaction request is greater than a quality of service value for a pending transaction in the slave transaction request queue; and
in response to the slave transaction request queue being full and the quality of service value for the transaction request being greater than the quality of service value for the pending transaction, remove the pending transaction from the slave transaction request queue before the pending transaction is completed and insert the transaction request into the slave transaction request queue.

2. The system of claim 1, wherein the slave module is operable to:
receive a second transaction request;
in response to determining that the slave transaction request queue is full, determine that a quality of service value for the second transaction request is not greater than a quality of service value for at least a second pending transaction in the slave transaction request queue; and
determine not to remove the second pending transaction from the slave transaction request queue and not to insert the second transaction request into the slave transaction request queue.

3. The system of claim 2, wherein the slave module is operable to:
in response to determining not to remove the second pending transaction, postpone the second transaction request by storing a record for the second transaction request for later replay of the second transaction request.

4. The system of claim 1, wherein the slave module is operable to reserve one or more slots in the slave transaction request queue for writing transaction requests.

5. The system of claim 1, further comprising a master module implementing a master transaction request queue, wherein the slave module is operable to receive the transaction request from the master module.

6. The system of claim 5, wherein the slave module is operable to:
call back, for each record of a postponed transaction request stored by the slave module, a replay of the postponed transaction request, thereby causing the master module to replay each postponed transaction request; and
perform arbitration between the replayed transaction requests to determine which of the replayed transaction requests to store in the slave transaction request queue.

7. The system of claim 5, wherein the master module is operable to:
send a second transaction request over a system bus to the slave module with a first quality of service value, thereby causing the slave module to store the second transaction request in the slave transaction request queue with the first quality of service value; and
send a second quality of service value for the second transaction request, thereby causing the slave module to update the first quality of service value in the slave transaction request queue with the second quality of service value.

8. The system of claim 5, wherein the master module is operable to:
initiate one or more replays of the transaction request until the transaction request is completed, each replay of the transaction request beginning from a data transfer beat where the transaction request was left off.

9. The system of claim 8, wherein the master module is operable to update the quality of service value for the transaction request on at least one of the one or more replays of the transaction request.

10. The system of claim 5, further comprising:
a system bus; and
a plurality of modules including the master module and the slave module,
wherein the plurality of modules is operable to communicate on the system bus using a non-blocking transaction protocol.

11. The system of claim 10, wherein the system bus comprises a plurality of master bus layers and a plurality of slave bus layers, and
wherein the system bus is configured to dynamically route signals of the master bus layers to the slave bus layers.

12. The system of claim 11, wherein the system bus includes:
a plurality of decoders, each decoder of the plurality of decoders coupled to one of the plurality of master bus layers and configured for decoding address signals received from the coupled master bus layer;
a plurality of arbiters, each arbiter of the plurality of arbiters coupled to each one of the plurality of decoders and configured to output a select signal based on results of an arbitration of transfer requests and quality of service signals generated by two or more master bus devices; and
a plurality of switches, each switch of the plurality of switches coupled to one arbiter of the plurality of arbiters and each one of the plurality of master bus layers, each one of the plurality of switches configured by one of the select signals to couple one of the plurality of master bus layers to one of the plurality of slave bus layers.

13. The system of claim 1, wherein the slave module is operable to:
in response to evicting the pending transaction, postpone the pending transaction by storing a record for the pending transaction for later replay of the pending transaction.

14. The system of claim 13, wherein the storing a record for the pending transaction for later replay comprises storing the pending transaction in a second queue for later replay of the transaction, the second queue being different from the slave transaction request queue and configured to store respective records for postponed pending transactions.

15. A method performed by a slave module, comprising:
receiving a transaction request;
determining that a slave transaction request queue implemented by the slave module is full;
determining that a quality of service value for the transaction request is greater than a quality of service value for a pending transaction in the slave transaction request queue; and
in response to the slave transaction request queue being full and the quality of service value for the transaction request being greater than the quality of service value for the pending transaction, evicting the pending transaction from the slave transaction request queue and inserting the transaction request into the slave transaction request queue, wherein evicting the pending transaction comprises removing the pending transaction from the slave transaction request queue before a pending transaction is completed.

16. The method of claim 15, further comprising:
receiving a second transaction request;
in response to determining that the slave transaction request queue is full, determining that a quality of service value for the second transaction request is no greater than a quality of service value for at least a second pending transaction in the slave transaction request queue;
determining not to evict the second pending transaction from the slave transaction request queue and not to insert the second transaction request into the slave transaction request queue; and
postponing the second transaction request by storing a record for the second transaction request for later replay of the second transaction request.

17. The method of claim 15, further comprising:
calling back, for each record of a postponed transaction request stored by the slave module, a replay of the postponed transaction request; and
performing arbitration between the replayed transaction requests to determine which of the replayed transaction request to store in the slave transaction request queue.

18. The method of claim 15, further comprising:
communicating with a master module on a system bus using a non-blocking transaction protocol, the master module implementing a master transaction request queue,
wherein receiving a transaction request comprises receiving, by the slave module the transaction request from the master module.

19. The method of claim 18, further comprising:
storing the transaction request in the slave transaction request queue with the quality of service value;
receiving, from the master module, a second quality of service value for the transaction request; and
updating the stored quality of service value for the transaction request in the slave transaction request queue with the second quality of service value.

20. The method of claim 15, further comprising:
reserving one or more slots in the slave transaction request queue for writing transaction requests.

21. A system comprising:
a slave module implementing a slave transaction request queue and operable to:
   receive a transaction request;
   determine that the slave transaction request queue is full;
   determine that a quality of service value for the transaction request is greater than a quality of service value for a pending transaction in the slave transaction request queue;
   evict the pending transaction from the slave transaction request queue and insert the transaction request into the slave transaction request queue;
   receive a second transaction request; and
   in response to determining that the slave transaction request queue is full, determine that a quality of service value for the second transaction request is no greater than a quality of service value for at least a second pending transaction in the slave transaction request queue;
determine not to evict the second pending transaction from the slave transaction request queue and not to insert the second transaction request into the slave transaction request queue; and
in response to determining not to evict the second pending transaction, postpone the second transaction request by storing a record for the second transaction request for later replay of the second transaction request.

\* \* \* \* \*